(12) United States Patent
Dhabi et al.

(10) Patent No.: US 9,397,332 B2
(45) Date of Patent: Jul. 19, 2016

(54) LITHIUM INSERTION MATERIAL FOR CATHODES AND A METHOD FOR PRODUCING THE SAME

(75) Inventors: Mohammed Dhabi, Uppsala (SE);
Torbjörn Gustafsson, Vänge (SE);
Björn Skårman, Höganas (SE)

(73) Assignee: HOGANAS AB (PUBL), Hoganas (SE)

( * ) Notice: Subject to any disclaimer, the term of this patent is extended or adjusted under 35 U.S.C. 154(b) by 217 days.

(21) Appl. No.: 14/126,061

(22) PCT Filed: Jun. 7, 2012

(86) PCT No.: PCT/EP2012/060809
§ 371 (c)(1),
(2), (4) Date: Dec. 13, 2013

(87) PCT Pub. No.: WO2012/171847
PCT Pub. Date: Dec. 20, 2012

(65) Prior Publication Data
US 2014/0145121 A1   May 29, 2014

Related U.S. Application Data

(60) Provisional application No. 61/498,248, filed on Jun. 17, 2011.

(30) Foreign Application Priority Data

Jun. 14, 2011 (EP) .................................... 11169811

(51) Int. Cl.
*H01M 4/88* (2006.01)
*H01M 4/36* (2006.01)
*C01B 33/20* (2006.01)
*H01M 4/136* (2010.01)
*H01M 4/58* (2010.01)
(Continued)

(52) U.S. Cl.
CPC ............... *H01M 4/364* (2013.01); *C01B 33/20* (2013.01); *C01B 33/32* (2013.01); *H01M 4/136* (2013.01); *H01M 4/5825* (2013.01); *H01M 10/0525* (2013.01); *Y02E 60/122* (2013.01)

(58) Field of Classification Search
CPC ... C01P 2002/72; Y02E 60/122; Y02E 60/12; H01M 4/136; H01M 4/02; H01M 4/58; H01M 4/5825; H01M 10/0525; C01B 33/22
USPC ....................... 252/182.1, 500; 429/408, 523
See application file for complete search history.

(56) References Cited

FOREIGN PATENT DOCUMENTS

| CN | 101540394 A | * | 9/2009 | ............. C01B 33/20 |
| CN | 101582495 A | * | 11/2009 | ............. H01M 4/02 |

OTHER PUBLICATIONS

International Search Report (PCT/ISA/210) mailed on Dec. 6, 2012, by the European Patent Office as the International Searching Authority for International Application No. PCT/EP2012/060809.
(Continued)

*Primary Examiner* — Khanh Tuan Nguyen
(74) *Attorney, Agent, or Firm* — Buchanan Ingersoll & Rooney P.C.

(57) ABSTRACT

The present invention relates to a combustion method for producing a lithium insertion material for a cathode in a Li-ion battery, the material comprising iron, lithium, silicon, and carbon.

7 Claims, 8 Drawing Sheets

Figure 1:
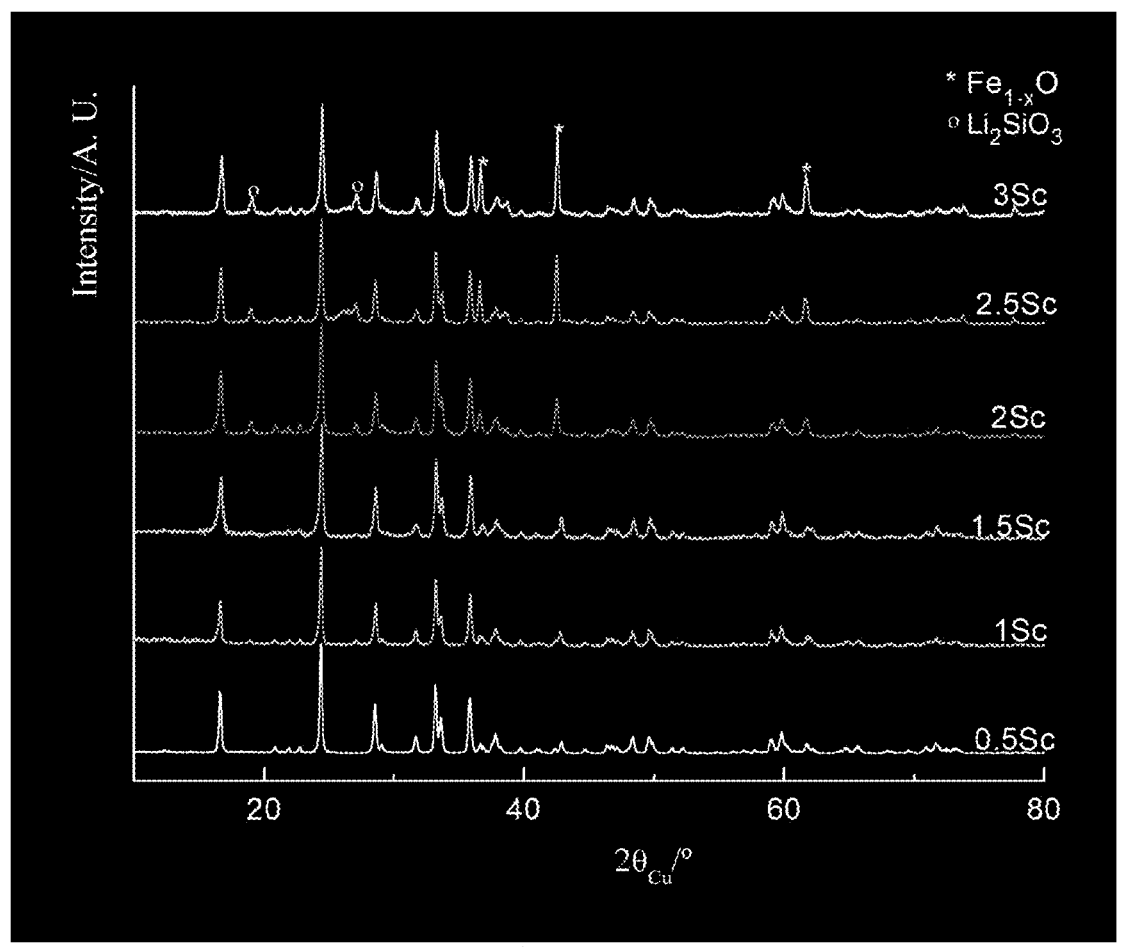

(51) Int. Cl.
$H01M\ 10/0525$ (2010.01)
$C01B\ 33/32$ (2006.01)

(56) References Cited

OTHER PUBLICATIONS

Written Opinion (PCT/ISA/237) mailed on Dec. 6, 2012, by the European Patent Office as the International Searching Authority for International Application No. PCT/EP2012/060809.

Xiaobing Huang et al., "Synthesis and Electrochemical Performance of $Li_2FeSiO_4/C$ as Cathode Material for Lithium Batteries", Solid State Ionics, Oct. 7, 2010, vol. 181, No. 31-32, pp. 1451-1455, XP-027347167.

T. Muraliganth et al., "Microwave-Solvothermal Synthesis of Nanostructured $Li_2MSiO_4/C$ (M=Mn and Fe) Cathodes for Lithium-Ion Batteries", Chemistry of Materials, vol. 22, No. 20, Oct. 26, 2010, pp. 5754-5761, XP-055011694.

R. Dominko et al., "Impact of Synthesis Conditions on the Structure and Perdormance of $Li_2FeSiO_4$", Journal of Power Sources, vol. 178, No. 2, Mar. 3, 2008, pp. 842-847, XP-022509837.

Hua-Jun Guo et al., "Preparation and Characteristics of $Li_2FeSiO_4/C$ Composite for Cathode of Lithium Ion Batteries", Transactions of Nonferrous Metals Society of China, Feb. 1, 2009, vol. 19, No. 1, pp. 166-169, XP 025895737.

T. Gustafsson et al., "The Polymer Battery as an Environment for In Situ X-Ray Diffraction Studies of Solid-State Electrochemical Processes", Electrochimica Acia, vol. 37, No. 9, pp. 1639-1643, 1992.

Nytén et al., "The lithium extraction/insertion mechanism in Li2FeSiO4", Journal of Materials Chemistry, 2006, vol. 16, pp. 2266-2272.

Nytén et al., "Surface characterization and stability phenomena in Li2FeSiO4 studied by PES/XPS", Journal of Materials Chemistry, 2006, vol. 16, pp. 3483-3488.

Nytén et al., "Electrochemical performance of Li2FeSiO4 as a new Li-battery cathode material", Electrochemistry Communications, 2005, vol. 7, Issue 2, pp. 156-160.

Nytén, "Low-Cost Iron-Based Cathode Materials for Large-Scale Battery Applications", Acta Universitatis Upsaliensis, 2006, vol. 179, 56 pages.

Larsson et al., "An ab initio study of the Li-ion battery cathode material Li2FeSiO4", Electrochemistry Communications, May 2006, vol. 8, Issue 5, pp. 797-800.

* cited by examiner

LITHIUM INSERTION MATERIAL FOR CATHODES AND A METHOD FOR PRODUCING THE SAME

FIELD OF THE INVENTION

The present invention relates to a method for producing a lithium insertion material for a cathode in a Li-ion battery, the material comprising iron, lithium, silicon, and carbon.

BACKGROUND

Lithium iron orthosilicate, $Li_2FeSiO_4$, has increasingly become a material of interest for cathodes in lithium ion batteries due to its promising electrochemical properties demonstrated the first time by Nyten et al. and also due to the low synthesis cost compared to that of the cobalt based cathodes (Nyten 2005, 2006). A limiting factor with polyanion materials is their poor conductivity. Synthesis conditions have a large influence on the electrochemical performances of $Li_2FeSiO_4$, and many studies have been done to find out the key factor for optimized electrochemical performances. Recent trends on $Li_2FeSiO_4$ are focused on development of active materials with nano-sized particles to improve the electrochemical performance by different synthesis techniques such as solid-state, sol-gel, hydrothermal, and hydrothermal assisted sol-gel.

SUMMARY OF THE INVENTION

The present invention relates to a new, cheaper and rapid combustion method, based on using various carbon sources as fuel for the combustion, adequate for preparing homogeneous nano-sized materials. The method is based on an oxidation-reduction reaction between soluble precursor salts (oxidizers) and soluble, sacrificial, carbonaceous compounds (fuels). In general terms, a combustion reaction may be controlled by several basic parameters: type of fuel and oxidizer, fuel-to-oxidizer ratio value, temperature of initiation of combustion, and relative volume of the evolved gaseous products. The method relies on using metal nitrates as oxidizers and soluble carbonaceous compounds as fuels, to synthesize an inexpensive, nano-sized, silicate cathode material.

According to the invention, nano-sized $Li_2FeSiO_4/C$ powders have been synthesized by a novel combustion process in which a very low-cost carbonaceous material, such as lactose, maltose, maltodextrine, sucrose, or citric acid, is used as fuel. As the amount of carbonaceous compound increases from half-stoichiometric to triple stoichiometric, the purity and morphology of the products is affected. XRD analysis shows that the amount of $Li_2SiO_3$ and $Fe_{1-x}O$ impurities increase with increasing the fuel (e.g. sucrose) amount. Combined SEM and TEM micrographs and BET analysis show that the addition of sucrose is favourable for increasing the surface area while the particle size decreases. The best electrochemical performance is reached for a sample with 50% excess of sucrose as compared to the stoichiometric amount, which delivered an attractive capacity of 130 mAh/g at C/20 rate with stable cycling performance even at 2C, owing to stable crystallinity and phase purity.

According to the invention, a simple combustion method based on carbonaceous fuels is employed to synthesize pure $Li_2FeSiO_4/C$. This leads to an improved cycling performance of this silicate cathode material. The process offers good sample homogeneity and allows synthesizing samples with small particle size.

DETAILED DESCRIPTION

In one aspect, the invention relates to a process for preparing a Li—Fe—Si—O—C material. Said material is a lithium insertion material, useful in cathodes for Li-ion batteries.

The process leading to the Li—Fe—Si—O—C material can be described as follows: $LiNO_3$ and $Fe(NO_3)_3 \cdot 9H_2O$ are used as the oxidant precursors, a carbonaceous compound, such as saccharides, polysachharides, dextrines, or organic acids, used as fuel and mixed with $SiO_2$ nanoparticles (fumed silica, Sigma-Aldrich, or silica sols, such as Bindzil®820DI, EKA Chem. AB), and the chemical reaction can be described as follows:

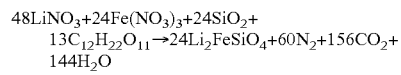

Saccharides may be e.g. lactose, sucrose, maltose. Polysaccharides could be the hydrolyzed derivates of starch or cellulose, such as e.g. dextrines or maltodextrines. Organic acids may be e.g. ascorbic acid, malic acid, adipic acid or citric acid. The silica sol is preferably of low pH, and has a low concentration of alkaline ions. With said precursors, the reaction yields nano-particles (i.e. having a size of about 25-100 nm) of $Li_2FeSiO_4/C$. This means that the material has the stoichiometric amounts of Li, Fe, Si and O, further containing carbon, e.g. in an amount of about 12% by weight of carbon.

The precursors (e.g. Li, Fe, and Si sources such as $LiNO_3$, $Fe(NO_3)_3$, and $SiO_2$ are dissolved and/or dispersed in distilled water, and the fuel (e.g. sucrose) is added to the solution. The mixture is then kept at elevated temperature to evaporate excess water. The water may be removed by other means, e.g. spray drying, pyrolysis, or vacuum drying. During the process of continued heating, the mixture forms a syrup, accompanied by a colour change from red to green, whereby the syrup forms into a brown foam. During further heating, the foam starts to burn or decompose spontaneously and transforms into a light, downy, brown-black powder. This powder may optionally be ground and further heat treated, optionally under a gas mixture of a composition chosen to maintain the iron in a +II state.

Consequently, in one aspect, the invention provides a method for producing a lithium insertion material for a cathode in a Li-ion battery, the method comprising the following steps:
a. dissolving $LiNO_3$ and $Fe(NO_3)_3$ and $SiO_2$ in (distilled) water, thus creating a solution;
b. adding a carbonaceous fuel to said solution, thus creating a mixture;
c. removing water;
d. optionally heating said mixture until combustion occurs;
e. heating in an inert atmosphere, or $CO/CO_2$-atmosphere;
f. collecting the resulting lithium insertion material.

It should be noted that $SiO_2$ is not soluble in water, so the term "dissolve" or "dissolving" is not literally applicable to $SiO_2$. $SiO_2$ nanoparticles are instead suspended or dispersed in solution, but the term "dissolve" or "dissolving", as used herein, may also include the meanings "suspend", "suspending", "disperse" or "dispersing". $SiO_2$ nano-sized particles such as fumed silica or solvent-stabilized silica sols may be used as the silicon source.

In one embodiment, the molar ratio of $LiNO_3$ and $Fe(NO_3)_3$ can be in the interval from 2:1 to 2.2:1.

In a further embodiment, the value for the (F:O)-ratio of the oxidizing and reducing valence of the metal nitrates (O) and the fuel (F), or carbonaceous compound e.g. sucrose, is between 1.2 and 1.7, or preferably between 1.4 and 1.6, or more preferably 1.5.

In one embodiment, the heat treatment is conducted at a temperature above 600° C. for at least 5 hours under a mixture of CO gas and $CO_2$ gas. The temperature may be as high as 800° C., and the heat treatment may last as long as 10 hours or more.

In another aspect, the invention provides a product obtained by the method according to the invention, comprising $Li_2FeSiO_4$, and carbon in an amount of 6-14 by weight, optionally having an average particle size of 70-100 nm, and optionally a surface area (SBET) of 55-65 $m^2/g$, and/or the resulting particles having a crystallite size of 25-40 nm.

In a preferred embodiment the product obtained by the method has a carbon content of 6-14%, or preferably 12%.

FIGURE LEGENDS

FIG. 1: X-ray diffraction patterns of $Li_2FeSiO_4/C$ materials synthesized with different amount of sucrose (0.5Sc, 1Sc, 1.5Sc, 2Sc, 2.5Sc and 3Sc).

Figure 2:
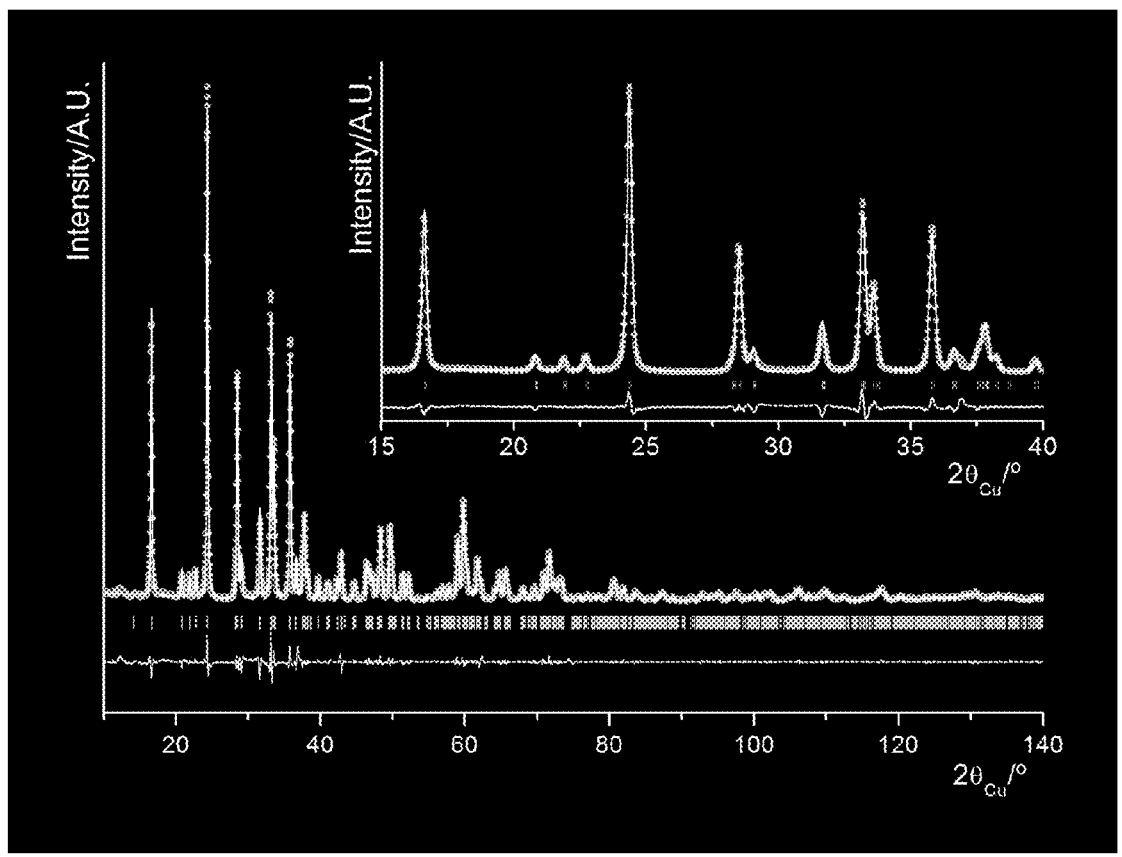

FIG. 2: Rietveld refinement of X-ray diffraction pattern obtained for $Li_2FeSiO_4/C$ material with 0.5Sc of sucrose. Detailed diffraction data in the 15-40° range is shown as an inset.

Figure 3:
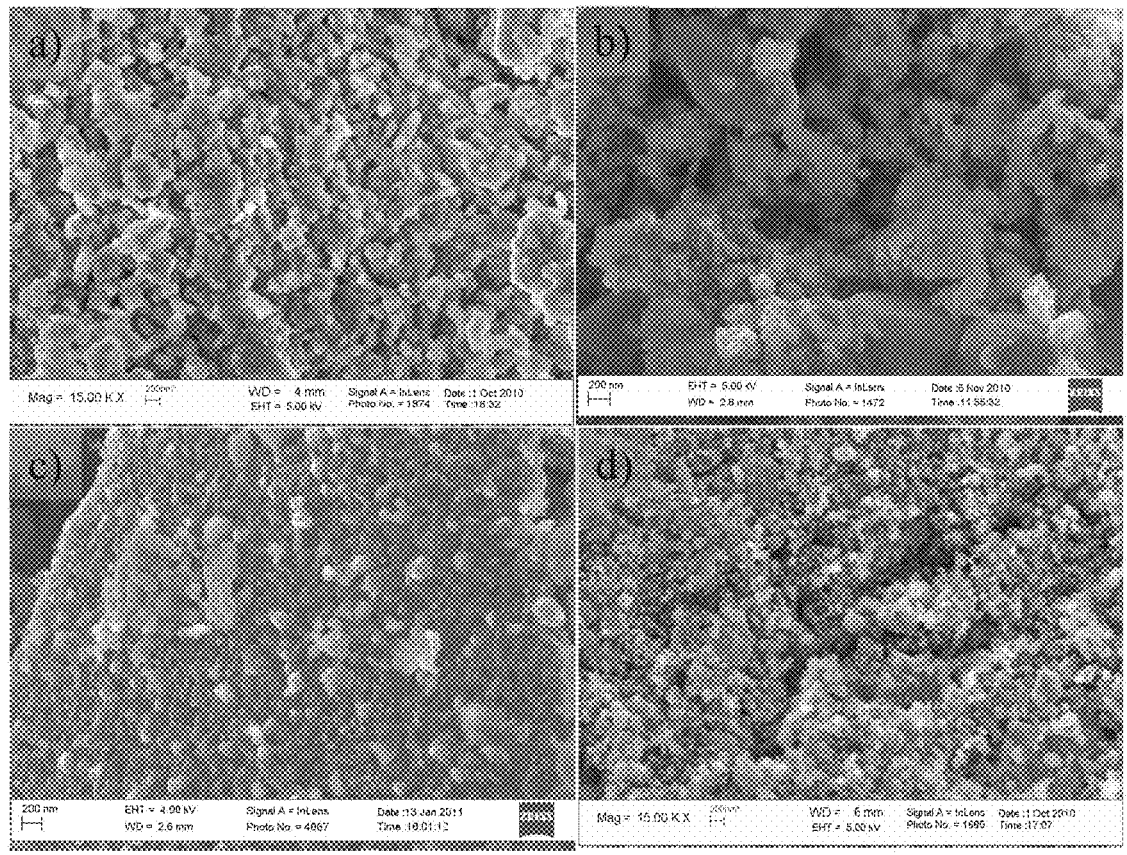

FIG. 3: SEM images of $Li_2FeSiO_4/C$ materials with various amount of sucrose: (a) 0.5Sc, (b) 1.5Sc, (c) 2Sc and (d) 3Sc.

Figure 4:
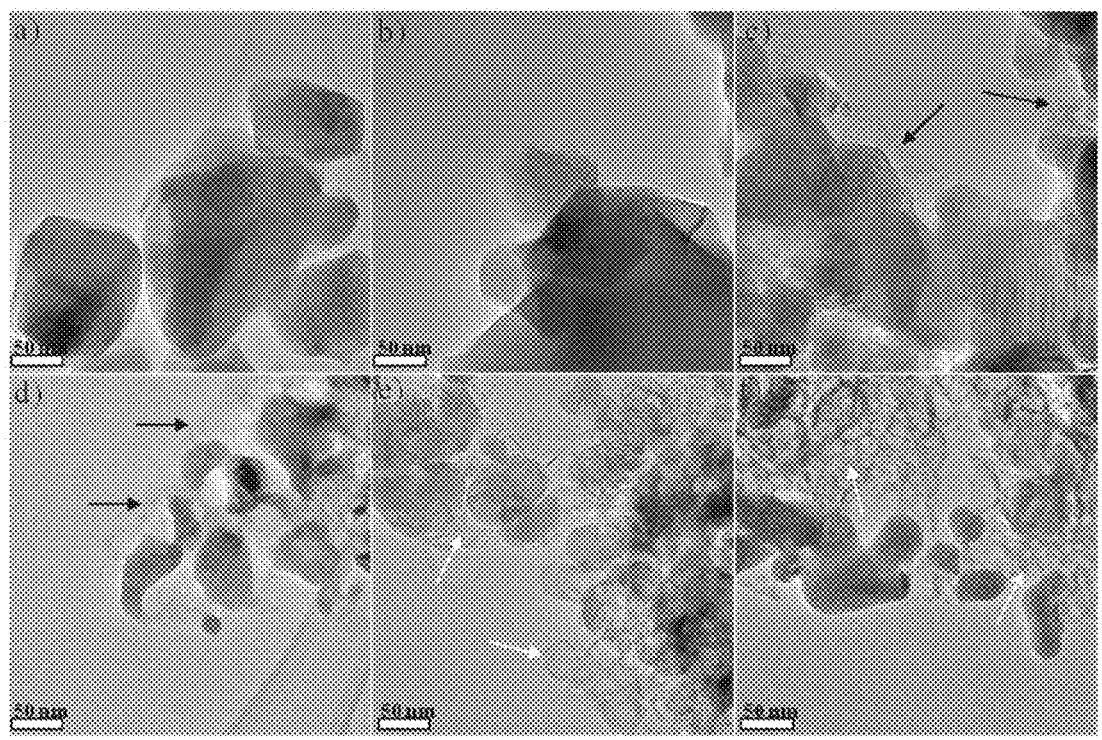

FIG. 4: TEM images of $Li_2FeSiO_4/C$ materials with various amount of sucrose: (a) 0.5Sc, (b) 1Sc, (c) 1.5Sc, (d) 2Sc, (e) 2.5Sc, and (f) 3Sc. The carbon and graphene are marked with black and white arrows, respectively.

Figure 5:
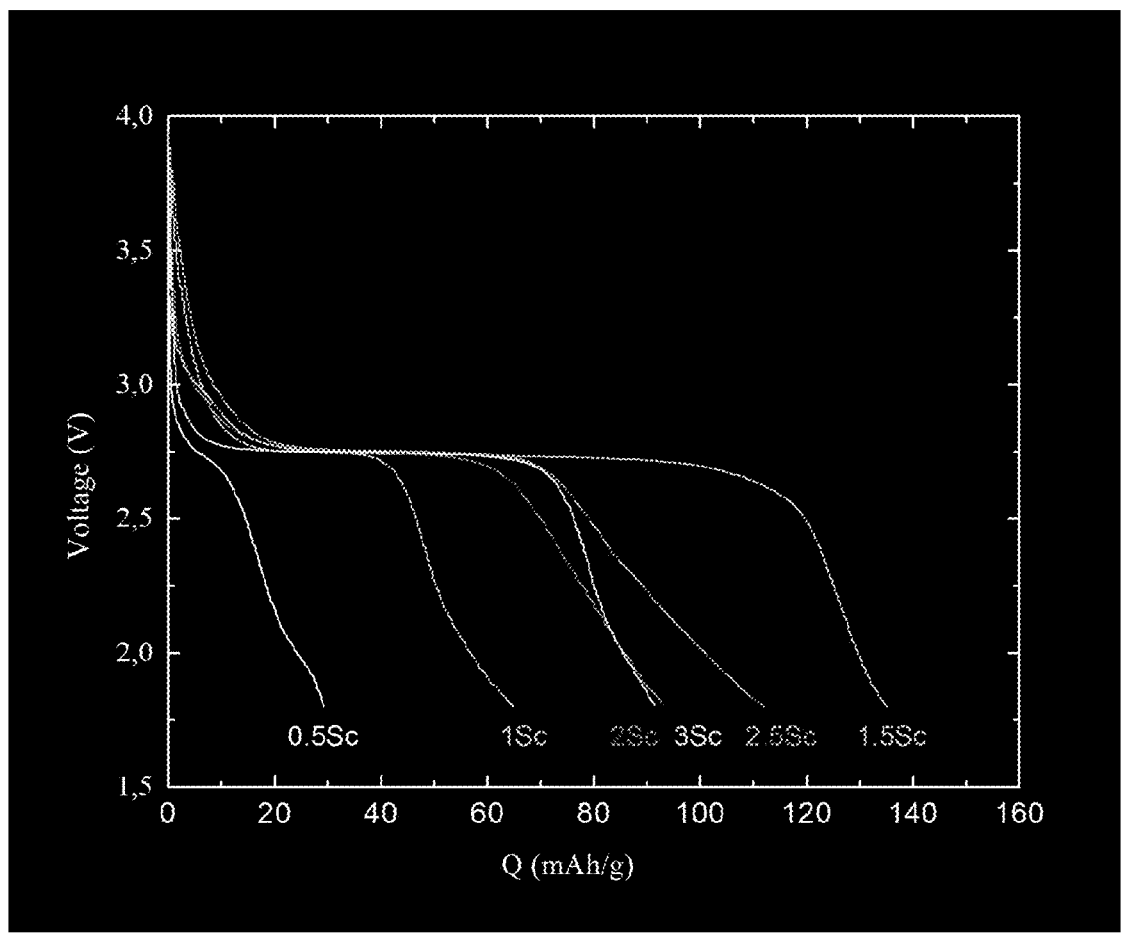

FIG. 5: The first discharge capacities for various $Li_2FeSiO_4/C$ cathodes synthesized at different amount of sucrose.

Figure 6:
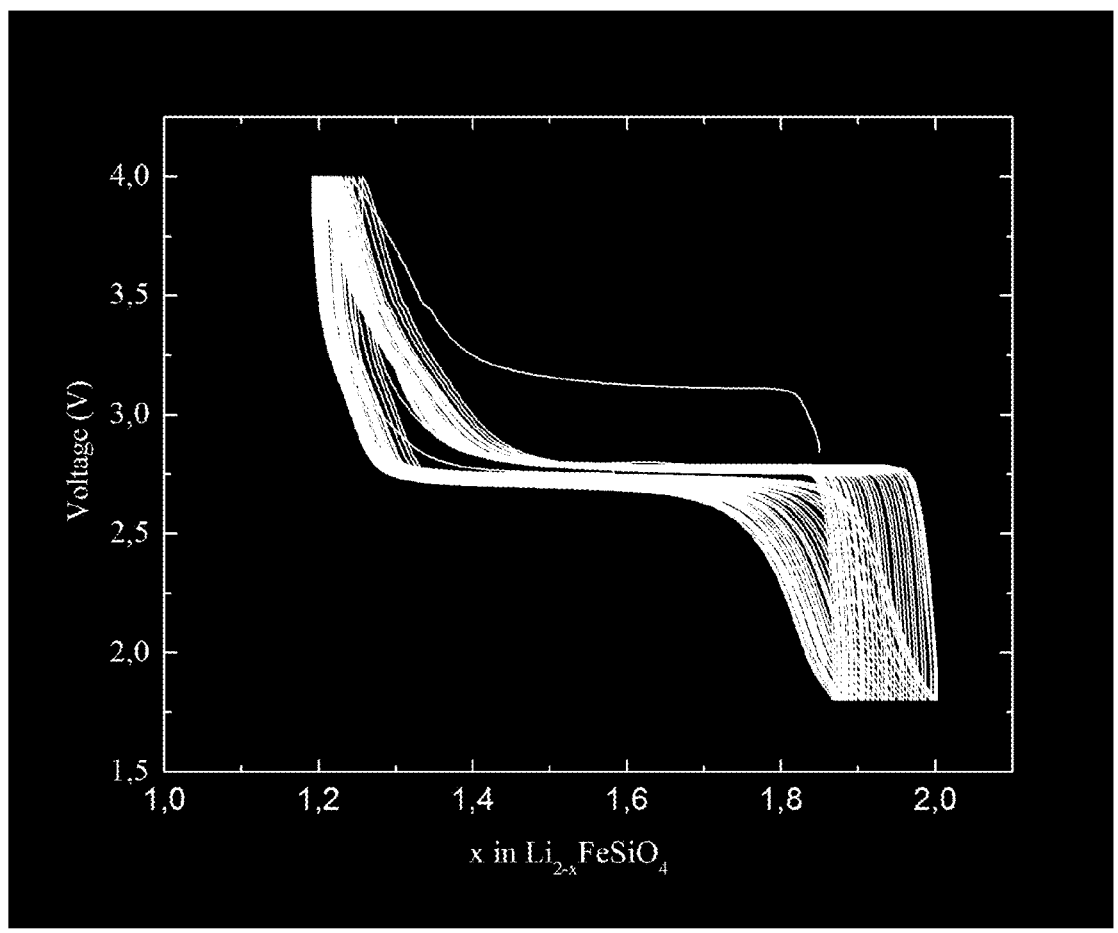

FIG. 6: Variation of the cell voltage vs. lithium amount at the C/20 rate for the first 50 galvanostatic charge/discharge cycles for $Li_2FeSiO_4/C$ synthesized with 50% excess of sucrose.

Figure 7:
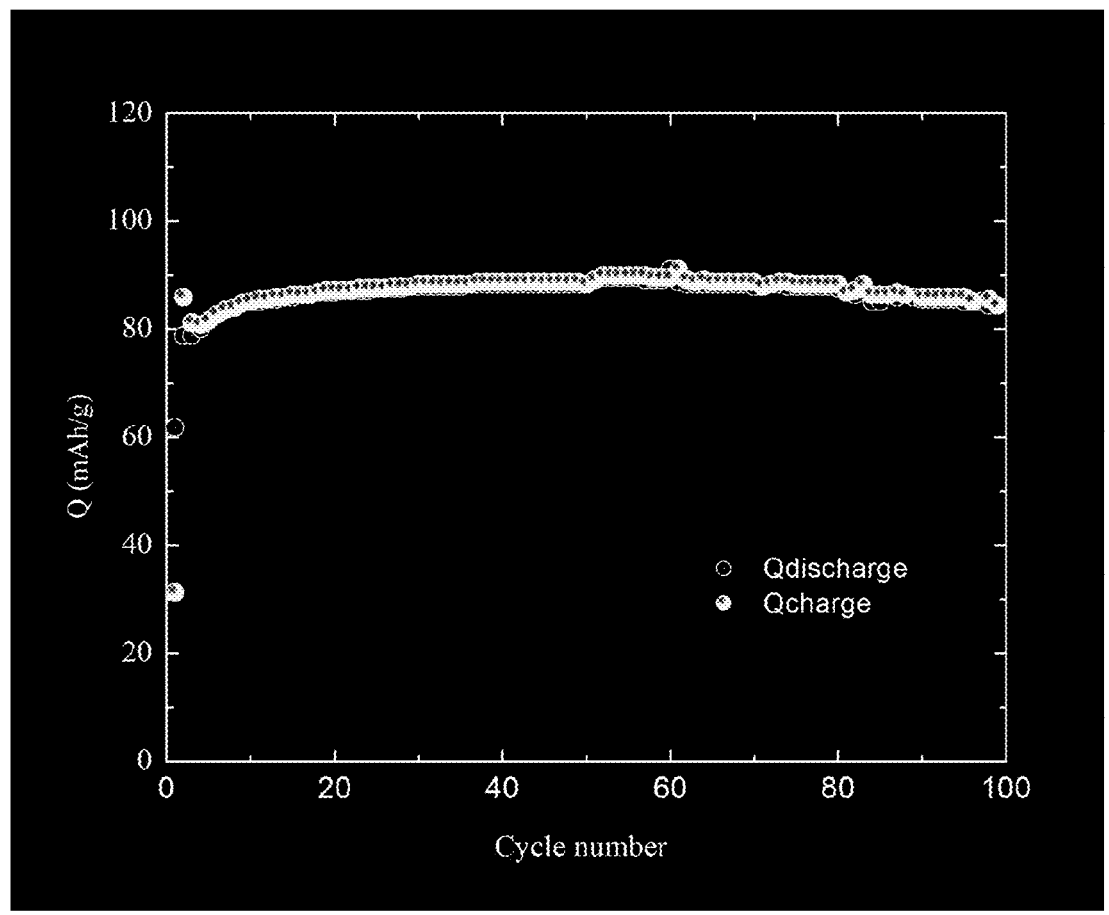

FIG. 7: Evolution of the charge and discharge capacity for a $Li//Li_2FeSiO_4$ (1.5Sc) cell during 100 cycles at the C/2 rate in the 1.8-4 V range.

Figure 8:
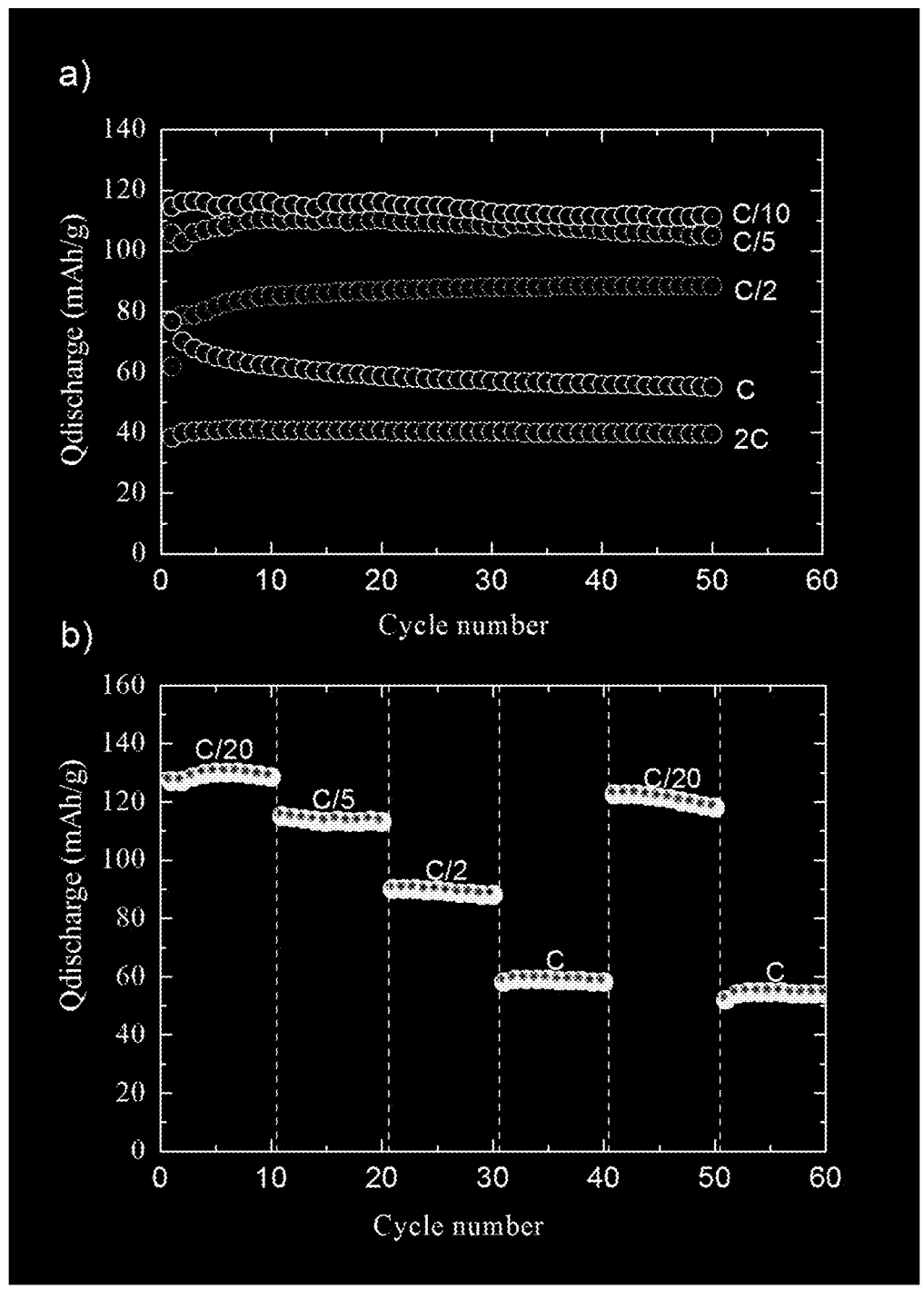

FIG. 8: Cyclic performance of $Li_2FeSiO_4$ (1.5Sc) cathode cycled between 1.8 and 4 V vs. $Li/Li^+$ at: a) different C/n rates over 50 cycles and b) successive sequences of a 10 cycles at different C/n rates.

EXAMPLES

Example 1

All starting materials used were of 99.99% purity. $Li_2FeSiO_4/C$ samples were prepared by the so-called combustion method using $LiNO_3$ (Sigma-Aldrich) and $Fe(NO_3)_3 \cdot 9H_2O$ (Sigma-Aldrich) as the oxidant precursors, sucrose (Sigma-Aldrich) as fuel and fumed $SiO_2$ nanoparticles (Sigma-Aldrich). Typically, the reaction can be described as follows:

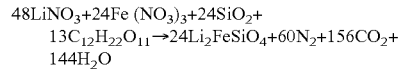

$$48LiNO_3 + 24Fe(NO_3)_3 + 24SiO_2 + 13C_{12}H_{22}O_{11} \rightarrow 24Li_2FeSiO_4 + 60N_2 + 156CO_2 + 144H_2O$$

Briefly, the preset stoichiometric amounts of reagent grade Li, Fe and Si sources were dissolved (or, in the case of fumed $SiO_2$, suspended and/or dispersed) in at least the minimum amount of distilled water; the dissolved fuel (sucrose) was then added to the solution. The beaker containing the reaction mixture was placed on an electric heater and kept at 120° C. for 2 hours to evaporate the excess water. The liquid adopted a syrup consistency and the colour changed from red to green while the syrup swelled up and transformed into brown foam. On continuing heating, this foamy mass started to burn spontaneously without flame and transformed finally to light and downy brownish-black powder. The as-formed powder was collected, ground in an agate mortar, and further heat-treated at 800° C. for 10 h under a flowing gas mixture ($CO/CO_2$: 50/50).

The mixture of the oxidants and sucrose was calculated on the basis of the total oxidizing and reducing valence of the metal nitrates (O) and the sucrose (F) according a F/O=1. Experiments with varying sucrose amounts were also carried out to investigate the influence of different F/O ratios (F/O=0.5; 1.5; 2; 2.5 and 3) The samples thus prepared are referred to hereafter as 0.5Sc, 1Sc, 1.5Sc, 2Sc, 2.5Sc and 3Sc, respectively, where the coefficient denotes the F/O ratio and Sc stands for sucrose.

Example 2

All samples were characterized by X-ray diffraction (XRD) using a Siemens D5000 diffractometer with Cu Kα radiation. The diffraction patterns were recorded in [10-120]° (2θ) angular range, using a 0.02° (2θ) step and a constant counting time of 10s. The lattice parameters and cation distributions were refined by the Rietveld method using the Fullprof program (J. Rodriguez-Carvajal, Fullprof, Program for Rietveld Refinement, version 3.7, LLB JRC (1997)). X-ray diffraction patterns of $Li_2FeSiO_4/C$ composites (0.5Sc, 1Sc, 1.5Sc, 2Sc, 2.5Sc and 3Sc) are compared in FIG. 1. Diffraction peaks can be indexed in a monoclinic cell ($P2_1/n$ space group) with the cell parameters a=8.2275(3) Å, b=5.0176(2) Å, c=8.2313(2) Å, and β=99.1308(3) (see Table 1). A comparison of the diffraction patterns for the $Li_2FeSiO_4/C$ composites with various amounts of sucrose also showed that increasing sucrose content may lead to increasing $Fe_{1-x}O$ and $Li_2SiO_3$ impurities.

TABLE 1

Table 1: Comparison of cell parameters obtained by the Rietveld refinement, BET surface area, crystallite size and carbon content for the $Li_2FeSiO_4/C$ samples as the amount of sucrose is increased.

| Sample | a/Å | b/Å | c/Å | β | $S_{BET}/$ $m^2 \cdot g^{-1}$ | Crystallite size*/nm | Carbon content/% |
|---|---|---|---|---|---|---|---|
| 0.5Sc | 8.2274(3) | 5.0175(2) | 8.2313(2) | 99.1308(2) | 3.66 | 43 | 0.76 |
| 1Sc | 8.2220(3) | 5.0137(2) | 8.2363(3) | 99.1303(3) | 9.67 | 41 | 5.44 |

TABLE 1-continued

Table 1: Comparison of cell parameters obtained by the Rietveld refinement, BET surface area, crystallite size and carbon content for the $Li_2FeSiO_4$/C samples as the amount of sucrose is increased.

| Sample | a/Å | b/Å | c/Å | β | $S_{BET}$/ $m^2 \cdot g^{-1}$ | Crystallite size*/nm | Carbon content/% |
|---|---|---|---|---|---|---|---|
| 1.5Sc | 8.2207(1) | 5.0171(2) | 8.2445(2) | 99.0758(2) | 59.75 | 29 | 11.38 |
| 2Sc | 8.2212(2) | 5.0198(3) | 8.2467(4) | 99.0493(3) | 74.54 | 27 | 18 |
| 2.5Sc | 8.2255(1) | 5.0198(2) | 8.2498(3) | 99.1632(3) | 91.31 | 25 | 20.63 |
| 3Sc | 8.2252(3) | 5.0144(2) | 8.2501(2) | 99.2277(2) | 117.47 | 23 | 21.05 |

*the average crystallite size was estimated from the full width at half maximum (FWHM) of diffraction line (111) considering the Scherrer formula FWHM (2θ) = 0.9λ/(L cosθ) with λ = 1.54 Å for the Kα Cu radiation and L the average crystallite size.

In order to accurately determine the structure of these materials, refinements by Rietveld method of X-ray data was performed using the Fullprof program. The Rietveld refinement was used to determine the lattice and structural parameters as well as the cationic distribution between the lithium and iron sites.

Firstly, a full pattern matching refinement allowed determining the lattice parameters and the profile parameters of the Pseudo-Voigt function used to describe the shape of the diffraction lines. Then, the structural refinement was carried out by considering the structure of $Li_2FeSiO_4$/C composites can be indexed in a monoclinic cell ($P2_1/n$ space group). As described in the $P2_1/n$ space group, the Li, Fe, Si, and O occupy 4e sites. All the crystallographic sites were constrained to be fully occupied. The isotropic atomic displacement parameters (Biso (Å$^2$)) were refined. Cell parameters obtained for the six-$Li_2FeSiO_4$/C composites are compared in Table 1. The $P2_1/n$ space group was used. Detailed results of the X-ray diffraction pattern refinement by the Rietveld method are given as example in Table 2 for 0.5Sc, whereas FIG. 2 gives a comparison of the experimental and calculated XRD patterns. A rather good minimization of the difference ($I_{obs.}-I_{cat.}$) with low Rietveld agreement factors ($R_{wp}$=10.9%; $R_B$=4.97%) suggest a good description of the structure by $P2_1/n$ space group.

The possible antisite defect between lithium and iron ions in the 4e sites was also checked. The refinement of all our XRD patterns assuming this structural hypothesis, i.e. $P2_1/n$ space group, shows that no exchange occurs between the Li and Fe ions.

Example 3

High Resolution Scanning Electron Microscopy was used to check trends in powder grain size and morphology with increasing sucrose amount. A high resolution scanning electron microscope (HRSEM LEO 1550) was used. FIG. 3 gives a comparison of SEM micrographs obtained for the $Li_2FeSiO_4$/C materials with various amount of sucrose (0.5Sc, 1.5Sc, 2Sc and 3Sc). In samples prepared with a low amount of sucrose (0.5Sc), there was a greater extent of aggregation of prticles, and a larger particle size distribution. By increasing the amount of sucrose, a significant decrease in particle size and a more uniform particle size distribution is observed. The crystallite size, the specific surface area and carbon content of all samples were also estimated by XRD, BET method and TGA study, respectively. Specific surface area measurements were carried out by the Brunauer, Emmet and Teller (BET) method with a Micrometrics ASAP 2020 Accelerated Surface Area and Porosimetry Analyzer.

TABLE 2

Structural and profile parameters obtained by Rietveld refinement of the X-ray diffraction pattern recorded for 0.5Sc sample.

Space group: $P2_1/n$
a = 8.2274(3) Å
b = 5.0175(2) Å
c = 8.2313(2) Å
β = 99.1308(2)

| | Site | Wyckoff positions | | | B(Å$^2$) | Occupancy |
|---|---|---|---|---|---|---|
| $Li_1$ | 4e | 0.6420(2) | 0.8771(4) | 0.6813(2) | 1.250(1) | 1.00 |
| $Li_2$ | 4e | 0.5877(1) | 0.2224(2) | 0.0584(1) | 1.250(1) | 1.00 |
| Fe | 4e | 0.2905(3) | 0.8021(5) | 0.5438(4) | 0.802(3) | 1.00 |
| Si | 4e | 0.0376(1) | 0.8136(6) | 0.7981(5) | 0.249(1) | 1.00 |
| $O_1$ | 4e | 0.8534(1) | 0.7294(2) | 0.8325(1) | 0.808(2) | 1.00 |
| $O_2$ | 4e | 0.4315(1) | 0.2060(1) | 0.8755(1) | 0.868(2) | 1.00 |
| $O_3$ | 4e | 0.6839(4) | 0.7611(2) | 0.4444(1) | 0.725(1) | 1.00 |
| $O_4$ | 4e | 0.9604(5) | 0.8525(2) | 0.2214(5) | 1.499(178) | 1.00 |

Conditions of the run

| | |
|---|---|
| Temperature | 300 K |
| Angular range | 10° ≤ 2θ ≤ 140° |
| Displacement sample holder(2θ) | 0.0225 |
| Number of fitted parameters | 56 |
| Conventional Rietveld R-factors for points with Bragg contribution | |
| $R_{wp}$ = 10.9%; $R_B$ = 4.97% | |

Samples were dried 10 h at 300° C. under nitrogen before measurement. The Carbon content was calculated from thermogravimetric analysis (TGA) using TA instruments Q500, with a 10° C. min$^{-1}$ heating rate under a purified air flow in the temperature range between 25° and 600° C. Table 1 gives all results for Li2FeSiO4\C samples at various quantities of sucrose. As shown in this table, with increasing of sucrose quantities, the surface area increased while the crystallite size decreased. A proportion of the surface area (increase from 3.66 to 117.47 m$^2$/g) would be attributed to the increased levels of residual carbon (0.76 to 21.05%) in the samples. However, the presence of increasing amounts of sucrose also inhibits crystallite growth which results in higher surface areas of the active $Li_2FeSiO_4$/C materials.

Example 4

In order to study the effect of sucrose content on the carbon coating status, Transmission electron microscopy (TEM) studies were performed on JEOL JEM-2100F microscope, equipped with field emission gun operated at 200 kV. The results are presented in FIG. 4.

It is clear that different amounts of sucrose results in different carbon distributions on $Li_2FeSiO_4$ particle surface, as well as different particle size of $Li_2FeSiO_4$. TEM images of samples 0.5Sc and 1Sc, containing only 0.76% and 5.44% carbon, respectively, do not provide information about carbon distribution, see FIG. 4(a-b), as the amount of carbon is too low to be detected. When the carbon content is increased to about 11.4% (1.5Sc), the carbon coating is comparatively uniform, and the conductive carbon coversall particles. For samples 2.5Sc and 3Sc, although the active materials are also coated completely by carbon, the carbon agglomerates were formed from excessive graphene-like carbon between or around the particles. For this reason, the electrochemical behaviour for these $Li_2FeSiO_4$/C materials was investigated by galvanostatic cycling.

Example 5

Electrochemical measurements were performed in aluminium pouch cells. Positive electrodes were prepared by spreading a mixture of 75% active material, 15% carbon black, and 10% of PVDF [poly(vinylidene fluoride)] dissolved in NMP (1-methyl-2-pyrrolidone) onto an aluminium foil. Circular electrodes (area: 3.14 cm$^2$) were dried under vacuum at 120 C in an argon-filled glove box (<3 ppm H$_2$O and O$_2$) before cell assembly. Batteries comprising the dried positive electrode, a glass fibre separator soaked in electrolyte, and a lithium metal counter electrode (0.38 mm thick) were assembled and packed in the polymer-coated aluminium pouch in a so called "Coffee-bag" configuration (T. Gustafsson, J. O. Thomas, R. Koksbang and G. C. Farrington, Electrochim. Acta 37 (1992) 1639). The electrolyte was 1 M LiPF$_6$ (Tomyama, dried over night at 80° C. in a vacuum furnace in the glove box) in an EC/DEC (Merck, battery grade and used as received) 2:1 by volume mixture. Charge—discharge tests were performed using a Digatron BTS600 battery testing system with different rates at 60° C.

To clarify the effect of the amount of sucrose on the electrochemical performance of the $Li_2FeSiO_4$/C, some electrochemical tests were carried out. FIG. 5 shows the first discharge curves of the cells with various $Li_2FeSiO_4$/C electrodes at C/20 rate over the potential range of 1.8-4.0 V. It can be seen that the initial discharge capacities of $Li_2FeSiO_4$/C samples synthesized with different amounts of sucrose 0.5Sc, 1Sc, 1.5Sc, 2Sc, 2.5Sc and 3Sc are 30, 64, 135, 94, 111 and 92 mAh.g$^{-1}$, respectively. From the XRD and BET measurements of the samples, we can explain why the $Li_2FeSiO_4$/C powder prepared with 1.5Sc delivers the highest discharge capacity. As described in the previous section, particles of $Li_2FeSiO_4$/C powder synthesized with low amounts of sucrose have low levels of impurities but also low specific surface area, which leads to low intrinsic conductivity. On the other hand, increasing the amount of sucrose influences the purity of the $Li_2FeSiO_4$/C material, resulting in the presence of two major impurities $Li_2SiO_3$ and $Fe_{1-x}O$. As a result, 1.5Sc seems to be the optimum amount of sucrose for the $Li_2FeSiO_4$/C with both high intrinsic conductivity due the carbon content (~12 wt %) and an almost phase-pure material, which results in the best electrochemical performance.

In order to determine the capacity and cyclability of 1.5Sc electrode, charge/discharge cycling on $Li_2FeSiO_4$/C electrodes at different rates was performed. FIG. 6 give the change in voltage vs. lithium amount during the first fifty galvanostatic charge/discharge cycles performed between 1.8 and 4 V (vs. Li$^+$/Li) at C/20 rate. It is seen that this sample shows a reversible capacity of 130 mAh/g, approaching the theoretical capacity of 166 mAh/g. A much higher charge potential was observed in the first cycle. This very good reversibility is confirmed in FIG. 7 that gives the evolution of charge/discharge capacities at C/2 rate during the 100 cycles. Indeed, one can observe that the capacity remains above 88 mAh/g after 100 cycles at high rate. This high cyclability could be attributed to an enhanced electronic conductivity due to the presence of carbon and to a small particle size obtained by combustion method. Since the individual $Li_2FeSiO_4$ particles are connected by a carbon network, the active $Li_2FeSiO_4$/C materials can be fully utilized for lithium extraction and insertion reactions. To characterize the material response to the change in cycling conditions, two different cycling modes were used. For the first one, the cycle performance of the cells was investigated for up to 50 cycles at different rates between C/10 to 2C. As seen in FIG. 8a, the discharge capacity dropped with increasing current density (C-rate) from 120 mAh/g to 88 mAh/g and 40 mAh/g at C/10, C/2 and 2C, respectively. For the second cycling mode with rate changes, sequences of charge/discharge cycles were successively performed at C/n rate, n could vary between 20 and 1. This cycling program was alternated between slow and fast cycling rates. FIG. 8b shows the discharge capacity obtained for this $Li_2FeSiO_4$/C material used as positive electrode material in lithium cell cycled in this condition. This electrochemical test clearly shows that the capacity retention remains very good between C/20 to C rates, in good agreement with the results reported in FIG. 8a. Furthermore, the obtained material shows a stable reversible capacity at C/20 rate even after cycling at high rate (C rate for instance) during a few cycles.

The invention claimed is:
1. A method for producing a lithium insertion material for cathodes in a Li-ion battery, the method comprising:
   a. dissolving LiNO$_3$, Fe(NO$_3$)$_3$ and SiO$_2$ in water, thus creating a solution;
   b. adding a carbonaceous fuel to said solution, thus creating a mixture;
   c. removing water from said mixture;
   d. heating in an inert atmosphere or a CO/CO$_2$-atmosphere; and
   e. collecting the resulting lithium insertion material.
2. A method according to claim 1, wherein a ratio (F/O) of oxidizing and reducing valence of the metal nitrates (O) and the fuel (F) has a value in an interval from 1.2 to 1.7.

3. A method according to claim 1, wherein the carbonaceous fuel is sucrose, lactose, maltodextrine, citric acid, adipic acid, or malic acid.

4. A method according to claim 1, wherein the heating (d) is conducted at a temperature above 600° C. for at least 5 hours under a mixture of CO gas and $CO_2$ gas.

5. A method according to claim 1, further including the heating of said mixture until combustion occurs.

6. A method according to claim 1, wherein the heating (d) is conducted in an inert atmosphere.

7. A method according to claim 1, wherein the heating (d) is conducted in a $CO/CO_2$-atmosphere.

* * * * *